G. STACKPOLE.
Improvement in Bit-Braces.
No. 5,042. Reissued Aug. 20, 1872.
Fig 1.
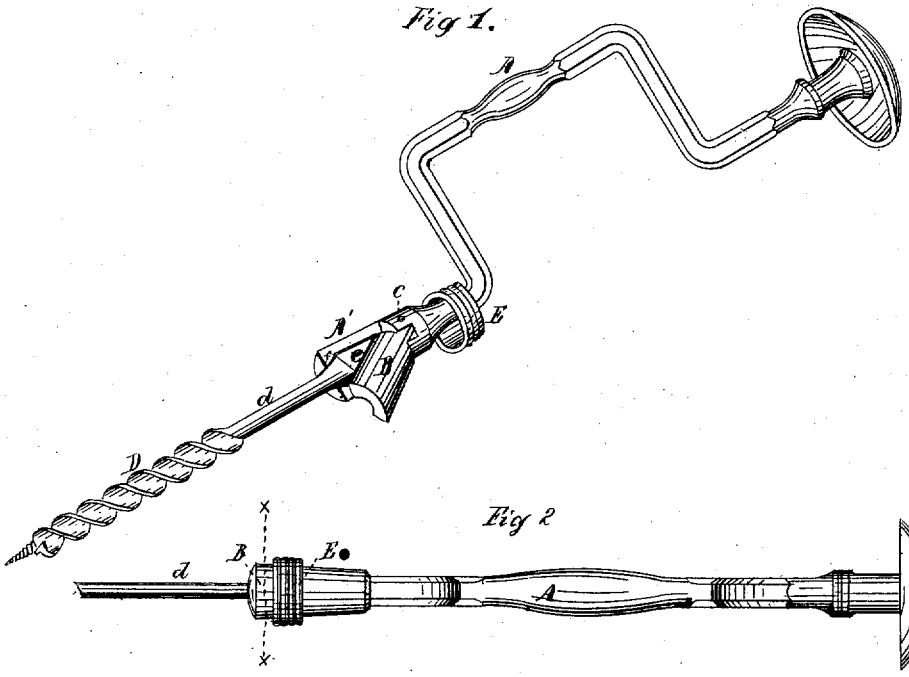
Fig 2
Fig 3.
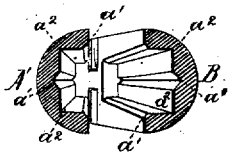
Fig 4.
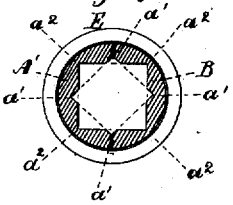
Fig 5.
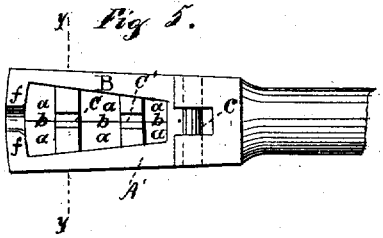
Witnesses.
A. J. Tibbits
J. H. Shumway.
Inventor.
W. H. Jones.
Assee of G. Stackpole
THE NORRIS PETERS CO., PHOTO-LITHO., WASHINGTON, D. C.

UNITED STATES PATENT OFFICE.

GREENLEAF STACKPOLE, OF ELIZABETH, NEW JERSEY, ASSIGNOR, BY MESNE ASSIGNMENTS, TO WILLIAM A. IVES, OF NEW HAVEN, CONNECTICUT.

IMPROVEMENT IN BIT-BRACES.

Specification forming part of Letters Patent No. 36,538, dated September 23, 1862; reissue No. 3,005, dated June 23, 1868; reissue No 5,042, dated August 20, 1872.

*To all whom it may concern:*

Be it known that GREENLEAF STACKPOLE, formerly of New York, in the county of New York and State of New York, now of Elizabeth, Union county, New Jersey, invented a new Improvement in Bit-Braces; and I do hereby declare the following, when taken in connection with the accompanying drawing and the letters of reference marked thereon, to be a full, clear, and exact description of the same, and which said drawing constitutes part of this specification, and represents, in—

Figure 1, a perspective view of my improved bit-brace, represented as partially open to allow the removal or exchange of the bit; Fig. 2, a side view of the same represented as closed, and tightly secured around to firmly confine the bit; Fig. 3, an end view with the jaw open, the interior being in this figure without the tang-bearings shown in Fig. 5 and without the contracted neck; Fig. 4, a cross-section on line *y y* of Fig. 5; and in Fig. 5, an inside view of one of the jaws.

Like letters in the several figures indicate the same or analogous parts.

This invention consists, first, in constructing the pair of jaws between which the bit is held with inwardly-contracted ends to close on the bit below the tang to prevent the brace being drawn from the bit; and, second, in constructing the said jaws with bearing-surfaces at different points to receive and grasp the tapered tang of the bit.

The body of the brace A is made in the usual manner and in the approved form, as shown in Figs. 1 and 2. Its lower end, as at A′, (see Fig. 5,) is constructed to form a continuation of the main portion of the implement, and constitutes one of the jaws for the reception of the shank or tang of the bit, the fellow jaw B being so formed at its upper extremity as to be hinged to and articulate upon the pin *a*. Externally, these jaws are of conical form, and over these a ring or sleeve, E, is arranged, its internal diameter relative to the external diameter or portion of the jaws upon which it bears being such that, as the sleeve is forced toward the larger diameter of the jaws, it will cause the jaws to approach each other to grasp the bit, and when forced to the smaller diameter of the jaws they may be opened so far as to allow the insertion or removal of the bit. Each of the jaws at the end is formed with an inward projection, *f*, so as to close on the spindle of the bit below the tang, as seen in Figs. 1 and 5; hence, the tang having a bearing within the jaws, these projections aid in drawing the bit from a hole which it has bored and avoid pulling the brace from the tang of the bit, a difficulty which would be liable to occur were not the bit grasped below the tang. Referring to Fig. 5, the inside of the jaws A′ and B are constructed with inwardly-projecting tang-bearings C C′. These bearings have V-shaped grooves, $a^1$ $a^2$, formed in them, as indicated, said grooves tapering in conformity with the taper of the shank or tang of the bit, which they are intended to gripe. The bearings C C′ are distinct from each other, as shown in Fig. 5. The tapered grooves $a^1$ and $a^2$ permit of the insertion in the socket *b* of bits having shanks of different sizes. A shank which would be grasped by the tapering grooves $a^1$ would be of less size or diameter than a shank of a size to be griped by the grooves $a^2$. In Fig. 3 the jaws are shown without the distinct and separate bearings C C′, the angular grooves $a^1$ $a^2$ being adapted, as in the other form, to receive two sizes of bit-shanks, but these grooves being formed or cut in the body of the metal composing the parts A′ and B. The form illustrated by Fig. 5 is, however, preferable to that shown in Fig. 3, for the reason that it allows of easier alteration when required.

It will be readily seen that, although the bit-brace may have been, in the first instance, formed for bits with shanks of only two given sizes, yet the grooves which are adapted to receive the smaller size may very readily be enlarged, if occasion require, so as to fit any given size intermediate between the original sizes of shanks which the stock was adapted to receive. This enlargement of the lesser grooves $a^1$ may be effected by simply deepening them in the bearings C and C′ by any ordinary means.

I claim as the invention of the said GREENLEAF STACKPOLE—

1. The bearings C C′ having grooves $a^1$ and $a^2$ therein, to admit different-sized bit-shanks without an enlargement of the grooves, to the extent of the whole length of the socket or the bit-shank, substantially as specified.

2. In a bit-brace, a pair of jaws constructed upon their meeting-surfaces to grasp the tang and with inward projections *f* to close upon the bit below the tang, and conical or tapering upon their outer surface, when combined with a sleeve operating upon said conical jaws, substantially as described, to cause the said jaws to close upon the bit in the brace, in the manner substantially as set forth.

W. A. IVES.

Witnesses:
A. J. TIBBITS,
J. H. SHUMWAY.